United States Patent [19]

Grace et al.

[11] Patent Number: 4,849,459

[45] Date of Patent: Jul. 18, 1989

[54] FLAME RETARDANT POLYURETHANE FOAMS

[75] Inventors: Oscar M. Grace, Madison Heights; William W. Levis, Jr., Wyandotte; Steven D. Gagnon, Detroit, all of Mich.

[73] Assignee: BASF Corporation, Parsippany, N.J.

[21] Appl. No.: 181,584

[22] Filed: Apr. 14, 1988

Related U.S. Application Data

[63] Continuation of Ser. No. 749,957, Jun. 27, 1985, abandoned.

[51] Int. Cl.[4] ............................................. C08G 18/14
[52] U.S. Cl. .................................. 521/110; 521/128; 521/137; 252/609
[58] Field of Search ............... 252/609, 607, 606, 182; 521/128, 163, 167, 122, 137, 110

[56] References Cited

U.S. PATENT DOCUMENTS

| | | | |
|---|---|---|---|
| 4,258,141 | 3/1981 | Jarre et al. | 521/114 |
| 4,293,657 | 10/1981 | Nissen et al. | 252/182 |
| 4,514,524 | 4/1985 | Fesman | 252/607 |
| 4,644,015 | 2/1987 | Scaccia et al. | 521/129 |

*Primary Examiner*—John F. Terapane
*Assistant Examiner*—Susan Wolffe
*Attorney, Agent, or Firm*—William G. Conger

[57] ABSTRACT

The invention pertains to flame retardant flexible polyurethane foams prepared by reacting a polyether polyol, or organic isocyanate, and a blowing agent incorporating (a) melamine in an amount ranging from about 30 weight percent to about 55 weight percent and an effective amount of (b) another flame retardant.

13 Claims, No Drawings

FLAME RETARDANT POLYURETHANE FOAMS

This is a continuation application Ser. No. 749,957 filed June 27, 1985 now abandoned.

BACKGROUND OF THE INVENTION

1. Field of the Invention

The present invention pertains to flexible foam compositions and in particular to flexible polyurethane flame-retarded foam compositions and methods for the preparation thereof. More particularly, the present invention relates to the preparation of flexible polyurethane flame-retarded foam compositions which contain an amount of melamine ranging from about 30 weight percent to about 55 weight percent of the total composition in conjunction with other flame retardant compounds.

2. Description of the Prior Art

The preparation of flexible polyurethane flame-retardant foam compositions are generally well known as evidenced by the following prior art. U.S. Pat. No. 4,022,718 teaches the preparation of high resilience cold-cured polyurethane foams incorporating 2,3-dibromo-1,4-butenediol as a chain extender and flame-retardant component. U.S. Pat. No. 4,147,847 teaches a method of preparing flexible, flame-retarded, polyurethane foams by employing specific foam stabilizers which reduce the required amount of normal flame-retardant additives. U.S. Pat. No. 4,162,353 teaches the preparation of flexible polyurethane foams incorporating therein a halo-substituted alkyl phosphate such as, for example, tris(2-chlorethyl)-phosphate and an unsubstituted trialkylphosphate such as, for example, triethylphosphate. The present invention is directed to preparing flame-retarded polyurethane foams which will pass both the Radiant Panel Flame Spread and the California 133 tests.

SUMMARY OF THE INVENTION

The present invention applies to both high-resiliency, flexible polyurethane foam compositions and conventional flexible polyurethane foam compositions which are prepared by the reaction of a polyoxyalkylene polyether polyol having at least two active hydrogen atoms and an average equivalent weight of from about 200 to about 2,500 with an organic polyisocyanate in the presence of (a) melamine and an effective amount of (b) another flame retardant compound.

For a more complete understanding of the present invention, reference is made to the following detailed description and the examples thereof.

Description of the Preferred Embodiments

It has unexpectedly been found that, in the preparation of flexible flame-retarded polyurethane foam, a mixture of (a) melamine and (b) an effective amount of another flame retardant compound incorporated into the polyoxyalkylene polyether polyol will result in foam which will pass both the Radiant Panel Test ASTM E162-81a and the California 133 test. It has been found that melamine in the amount ranging from about 30 weight percent to about 55 weight percent of the total composition in combination with other flame retardants in the amount of about 1 weight percent to about 15 weight percent of the total composition will enable polyurethane foam to be prepared which will pass these tests.

Amond the flame retardant compounds in conjunction with melamine which may be employed are tetrakis(2-chloroethyl) ethylene phosphonate, pentabromodiphenyl oxide, tris(1,3-dichloropropyl) phosphate, tris(beta-chloroethyl) phosphate, molybdenum trioxide, ammonium molybdate, ammonium phosphate, pentabromodiphenyloxide, tricresyl phosphate, 2,3-dibromopropanol, hexabromocyclododecane, dibromoethyldibromocyclohexane, tris(2,3-dibromopropyl)-phosphate, and tris(beta-chloropropyl)phosphate.

Representative polyols which may be employed in the preparation of the flame retardant polyurethane foams are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 100 to 10,000, preferably from 200 to 2500.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\alpha$-hydromuconic acid, $\alpha$-butyl-$\alpha$-ethyl-glutaric acid, $\alpha,\beta$-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, $\alpha$-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two -SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Other polyols which may be employed have incorporated therein vinylic polymers. These polyols may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056, the disclosures of which are herein incorporated by reference, or (3) by low temperature polymerization in the presence of chain transfer agents. These polymerizations may be carried out at a temperature between 65° C. and 170° C., preferably between 75° C and 135° C.

The polyols which may be employed in the preparation of the graft polymer dispersions are well known in the art. Both conventional polyols essentially free from ethylenic unsaturation such as those described in U.S. Reissue Pat. No. 28,715 and unsaturated polyols such as those described in U.S. Pat. No. 3,652,659 and Reissue No. 29,014 may be employed in preparing the graft polymer dispersions used in the instant invention, the disclosures of which are incorporated by reference.

The polyurethane foams employed in the present invention are generally prepared by the reaction of a polyoxyalkylene polyether polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate. Toluene diisocyanate is preferred.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane foam were determined by the following ASTM tests:
Density—D1622-63
Tensile Strength—D1623-72
Elongation—D412
Split Tear—D470
Compression Set—D395
Compression Load—D1564
Humid Aging—D1564
Additional tests included the
California Bulletin No. 117 Test
California 133 Test
Radiant Panel Test ASTM E162-81a The following abbreviations are employed in the examples below:
Polyol A is a propylene oxide/ethylene oxide adduct of glycerine having a hydroxyl number of 35 and containing 16.5 percent ethylene oxide.
Polyol B is a propylene oxide adduct of propylene glycol containing 50 percent of 2:1 styrene:acrylonitrile graft dispersion having a hydroxyl number of about 69.7.
Polyol C is a propylene oxide/ethylene oxide adduct of glycerine having a hydroxyl number of 56 and containing 9.0 percent ethylene oxide.
Polyol E is a propylene oxide adduct of a mixture of glycerine and propylene glycol having a hydroxyl number of 57.6.
Polyol F is a propylene oxide/ethylene oxide adduct of trimethylolpropane having a hydroxyl number of 25 and containing 15 percent ethylene oxide.
Polyol G is a propylene oxide adduct of propylene glycol having a hydroxyl number of 29 and containing 18 percent ethylene oxide.
Polyol H is a propylene oxide adduct of dipropylene glycol having a hydroxyl number of 29 and containing 18 percent ethylene oxide.
DEOA is diethanolamine.
TEOA is triethanolamine.
Silicone 5043 is a silicone surfactant manufactured by Dow Corning Corporation.
T-12 is dibutyltin dilaurate.
Freon 11 is monoflurotrichloromethane.
Dabco 33LV is a 33 percent solution of triethylene diamine in dipropylene glycol.
Niax A-1 is an amine catalyst manufactured by Union Carbon & Carbide Corporation.
TDI is toluene diisocyanate.
Fyrol CEF is tris(beta-chloroethyl)phosphate.
DE60F is pentabromodiphenyl oxide.
Thermolin 101 is tris(2,3-dibromopropyl)phosphate.
Fyrol PCF is tris(beta-chloropropyl)phosphate.

Examples 1-22

Examples 1-22 were prepared by employing the following procedure:
Blend A, composed of the polyol or polyol blend Fyrol CEF, Fyrol PCF or Thermolin 101, Freon 11, catalyst T-12, DEOA, and melamine in the proportions listed, was charged into a 150-gallon tank equipped with a turbine blade agitator turning at 100 rpm and agitated for about three hours at 72° F. Blend B, composed of water, Dabco 33LV, NIAX A-1 and additional DEOA was charged into another tank. Silicone surfactant DC-5043 was charged into a third tank and the TDI was charged into a fourth tank. These components were metered into a Hennecke UBT foam machine running with a mixer speed of 5000 rpm in the ratios of 82:1.5:0.5:13.6. The mixture was discharged from the mixing head unto a conveyor. The foam expanded to its full height in about three minutes. After a sufficient cure time the foams were submitted for physical property determinations.

TABLE I

| | 1 | 2 | 3 | 4 | 5 | 6 | 7 | 8 |
|---|---|---|---|---|---|---|---|---|
| Formulation | | | | | | | | |
| Polyol A | 95.0 | 87.0 | — | 87.0 | 87.0 | — | — | 92.0 |
| Polyol B | — | 8.0 | 8.0 | 8.0 | 8.0 | — | — | 8.0 |
| Polyol C | — | — | 87.0 | — | — | — | — | — |
| Polyol E | — | — | — | — | — | 95.0 | 95.0 | — |
| Fyrol CEF | 5.0 | 5.0 | 5.0 | 5.0 | 5.0 | 5.0 | 5.0 | 2.0 |
| Melamine | 100.0 | 100.0 | 100.0 | 100.0 | 100.0 | 100.0 | 100.0 | 100.0 |
| DEOA | 0.97 | 1.0 | 0.97 | 1.2 | 1.2 | — | — | 1.2 |
| TEOA | — | — | 0.83 | — | — | — | — | — |
| Silicone 5043 | 1.2 | 1.2 | 1.2 | 1.4 | 1.4 | 1.0 | 1.0 | 1.4 |
| T-12 | 0.1 | 0.1 | 0.1 | 0.1 | 0.1 | 0.65 | 0.45 | 0.1 |
| Freon 11 | 5.0 | 5.0 | 5.0 | 5.9 | 5.9 | 5.9 | 5.9 | 2.0 |
| Water | 2.0 | 2.4 | 2.0 | 2.4 | 2.4 | 2.4 | 2.4 | 2.1 |
| Dabco 33LV | 0.15 | 0.18 | 0.15 | 0.18 | 0.18 | 0.3 | 0.3 | 0.18 |
| Niax A-1 | 0.05 | 0.06 | 0.05 | 0.06 | 0.06 | — | — | 0.06 |
| TDI (110 Index) | 29.59 | 34.33 | 34.69 | 34.94 | 34.94 | 34.74 | 34.74 | 30.63 |
| Foam Properties | | | | | | | | |
| Density, PCF | 3.72 | 3.45 | 3.63 | 3.63 | 3.44 | 3.34 | 3.74 | 4.76 |
| Tensile Strength, PSI. | 6.5 | 8.8 | 6.0 | 10.8 | 7.4 | 8.4 | 9.2 | 9.9 |
| Elongation, % | 97 | 98 | 65 | 103 | 107 | 93 | 87 | 90 |
| Tear, PI | 0.9 | 1.1 | 0.9 | 1.3 | 1.0 | 1.3 | 1.1 | 1.1 |
| Resilience, % | 62 | 60 | 56 | 55 | 55 | 48 | 48 | 62 |
| ILD, lb./50 sq. in (4 inch) | | | | | | | | |
| 25% | 28.3 | 36.0 | 38.9 | 29.7 | 21.5 | 42.7 | 50.9 | 54.0 |
| 65% | 82.9 | 107.3 | 107.9 | 97.8 | 68.0 | 107.3 | 135.9 | 185.0 |
| Sag Factor | 2.93 | 2.98 | 2.77 | 3.29 | 3.16 | 2.51 | 2.67 | 3.43 |
| Recovery, % | 78.6 | 76.9 | 77.6 | 74.4 | 75.8 | 72.1 | 74.5 | 81.5 |
| Compression Sets, % | | | | | | | | |
| 50% | 10.7 | 13.9 | 7.0 | 21.3 | 37.4 | 5.1 | 6.4 | 8.0 |
| 90% | 67.6 | 64.8 | 4.7 | 85.2 | 93.1 | 38.5 | 5.7 | 5.8 |
| Humid Aged 5 hrs at 250° F. | | | | | | | | |
| CLD, % of original 50% | 46.1 | 48.7 | 45.9 | 49.3 | 52.9 | 64.6 | 61.7 | 38.4 |
| Compression Sets, % | | | | | | | | |
| 50% | 20.7 | 29.5 | 21.0 | 41.9 | 36.7 | 11.9 | 11.6 | 12.1 |
| 90% | 70.5 | 80.1 | 83.7 | 81.9 | 65.2 | 71.7 | 49.2 | 31.8 |
| H.A. Tensile, STR., PSI | 6.2 | 9.1 | 7.2 | 10.5 | 7.4 | 10.7 | 11.1 | 6.9 |
| Air Flow Crushed | 1.23 | 0.77 | 0.97 | 1.08 | 1.43 | 0.85 | 1.35 | 1.04 |
| Pounding Fatigue, % Loss | | | | | | | | |
| Height | 1.2 | 1.8 | 2.0 | — | — | — | — | 1.5 |
| 40% ILD | 33.8 | 28.8 | 61.5 | — | — | — | — | 32.4 |
| Oxygen Index, % O$_2$ | 31.5 | 30.5 | 30.5 | 32.0 | 31.0 | 28.5 | 30.0 | 29.9 |
| Cal. 117 Open Flame | | | | | | | | |
| Original | PASS | PASS | PASS | PASS | PASS | PASS | PASS | PASS |
| Heat Aged | PASS | PASS | PASS | PASS | PASS | PASS | PASS | PASS |
| Smoldering, % Wt. Retained | 99.3 | 99.1 | 99.4 | 99.2 | 99.1 | 98.9 | 98.6 | 99.2 |
| Radiant Panel, Flame Spread | | | | | | | | |
| SWRI | 28 | 34 | 50 | 39 | 48 | 314 | 303 | 197 |
| Cal. 133 Test, Bare | — | PASS | — | — | — | — | — | PASS |
| Covered | PASS | PASS | PASS | PASS | PASS | FAIL | FAIL | — |

TABLE II

| Formulation | 9 | 10 | 11 | 12 | 13 | 14 | 15 | 16 | 17 | 18 | 19 | 20 | 21 | 22 |
|---|---|---|---|---|---|---|---|---|---|---|---|---|---|---|
| Polyol A | 87.0 | 87.0 | 87.0 | 87.0 | 87.0 | 87.0 | 92.0 | 92.0 | 92.0 | 92.0 | 92.0 | — | — | — |
| Polyol B | 8.0 | 8.0 | 8.0 | 8.0 | 8.0 | 8.0 | 8.0 | 8.0 | 8.0 | 8.0 | 8.0 | 8.0 | 8.0 | 8.0 |
| Polyol F | — | — | — | — | — | — | — | — | — | — | — | 65.0 | 65.0 | 65.0 |
| Polyol G | — | — | — | — | — | — | — | — | — | — | — | 27.0 | 27.0 | — |
| Polyol H | 5.0 | 5.0 | 5.0 | 5.0 | 5.0* | 5.0 | 5.0 | — | 2.0* | 2.0* | 2.0* | 5.0 | — | 27.0 |
| Fyrol CEF | 85.0 | 85.0 | 100.0 | 100.0 | 100.0 | 100.0 | 100.0 | 100.0 | 150.0 | 100.0 | 150.0 | 100.0 | 100.0 | 10.0 |
| Melamine | 1.19 | 1.22 | 1.0 | 1.0 | 1.0 | 1.08 | 1.175 | 1.175 | 1.2 | 1.175 | 1.15 | 1.175 | 1.175 | 100.0 |
| Deoa | 1.0 | 1.0 | 1.2 | 1.2 | 1.2 | 1.2 | 1.4 | 1.4 | 1.4 | 1.4 | 1.4 | 1.4 | 1.4 | 1.175 |
| Silicone 5043 | 0.1 | 0.1 | 0.1 | 0.1 | 0.1 | 0.1 | 0.1 | 0.1 | 0.1 | 0.1 | 0.1 | 0.1 | 0.1 | 1.0 |
| T-12 | 5.0 | 5.0 | 5.0 | 5.0 | 5.0 | 5.0 | 10.0 | 10.0 | 7.0 | 2.0 | 2.0 | 10.0 | 10.0 | 0.1 |
| Freon 11 | 2.4 | 2.8 | 2.4 | 2.4 | 2.4 | 2.6 | 2.1 | 2.1 | 2.4 | 2.1 | 2.7 | 2.1 | 2.1 | 10.0 |
| Water | 0.17 | 0.19 | 0.18 | 0.18 | 0.18 | 0.195 | 0.1575 | 0.1575 | 0.18 | 0.1575 | 0.14 | 0.1575 | 0.1575 | 2.1 |
| Dabco 33LV | 0.055 | 0.065 | 0.06 | 0.06 | 0.06 | 0.065 | 0.0525 | 0.0525 | 0.06 | 0.0525 | 0.05 | 0.0525 | 0.0525 | 0.158 |
| Niax A-1 | 0.5 | 0.5 | — | — | — | — | — | — | — | — | — | — | — | 0.053 |
| Reactint Blue X-44 | 34.26 | 38.52 | — | — | — | — | — | — | — | — | — | — | — | — |
| TDI (108 Index) | — | — | — | — | — | 100 | 30.57 | 30.57 | 33.68 | 30.57 | 33.6 | 29.22 | 29.22 | 29.2 |
| TDI (105 Index) | — | — | 100 | 110 | 120 | 33.41 | — | — | — | — | — | — | — | — |
| TDI, Index | — | — | — | — | — | — | — | — | — | — | — | — | — | — |
| PBW | — | — | 31.27 | 34.39 | 37.54 | — | — | — | — | — | — | — | — | — |
| Foam Properties | | | | | | | | | | | | | | |
| Density, PCF | 3.34 | 2.62 | 3.65 | 3.30 | 3.12 | 3.18 | 3.56 | 3.67 | 4.41 | 4.65 | 4.78 | 3.36 | 3.52 | 3.51 |
| Tensile Strength, PSI | 8.9 | 8.7 | 9.1 | 9.7 | 9.6 | 9.4 | 6.8 | 6.7 | 7.1 | 10.5 | 11.3 | 5.2 | 6.2 | 8.0 |
| Elongation, % | 97 | 110 | 113 | 110 | 103 | 117 | 70 | 75 | 73 | 83 | 77 | 78 | 96 | 143 |
| Tear, PI | 1.0 | 1.1 | 1.1 | 1.2 | 1.1 | 1.1 | 0.8 | 0.8 | 0.7 | 1.1 | 1.0 | 0.9 | 1.0 | 1.1 |
| Resilience, % | 58 | 52 | 58 | 58 | 52 | 54 | 60 | 58 | 58 | 59 | 52 | 60 | 63 | 63 |
| ILD, lb/50 sq. in (4 inch) | | | | | | | | | | | | | | |
| 25% | 35.8 | 29.5 | 22.0 | 27.4 | 31.9 | 18.0 | 30.9 | 34.3 | 43.1 | 52.6 | 57.5 | 30.0 | 30.8 | 17.9 |
| 65% | 106.2 | 81.9 | 74.1 | 85.0 | 94.9 | 59.4 | 105.3 | 106.6 | 162.0 | 173.6 | 215.0 | 83.4 | 91.7 | 60.0 |
| Sag Factor | 2.97 | 2.78 | 3.37 | 3.10 | 2.97 | 3.30 | 3.41 | 3.10 | 3.76 | 3.30 | 3.74 | 2.78 | 2.98 | 3.35 |
| Recovery, % | 73.7 | 67.5 | 73.6 | 70.4 | 67.1 | 68.3 | 80.9 | 77.1 | 75.6 | 81.4 | 73.9 | 79.0 | 77.9 | 79.3 |
| Compression Sets, % | | | | | | | | | | | | | | |
| 50% | 11.8 | 24.2 | 49.1 | 29.6 | 19.9 | 62.5 | 13.3 | 11.4 | 9.6 | 5.3 | 12.9 | 12.0 | 14.6 | 21.0 |
| 90% | 79.6 | 88.3 | 94.4 | 87.5 | 84.5 | 95.4 | 71.9 | 39.8 | 12.5 | 4.7 | 10.5 | 61.6 | 75.0 | 76.9 |
| Humid Aged 5 hrs at 250° F. CLD, % of original 50% Compression Set, % | 45.4 | 74.3 | 55.2 | 54.5 | 51.7 | 59.4 | 40.6 | 43.1 | 33.4 | 30.7 | — | 46.4 | 45.3 | 44.7 |
| 50% | 30.3 | 44.2 | 33.0 | 37.3 | 58.0 | 45.1 | 30.5 | 29.1 | 20.5 | 16.5 | 13.8 | 23.3 | 25.9 | 22.8 |
| 90% | 88.6 | 88.6 | 50.3 | 82.8 | 87.3 | 77.3 | 74.6 | 78.7 | 17.0 | 15.7 | 10.5 | 38.2 | 26.4 | 31.0 |
| H.A. Tensile, STR., PSI | 8.0 | 6.8 | 5.9 | 5.9 | 6.5 | 5.8 | 6.0 | 5.7 | 3.4 | 5.0 | 7.8 | 4.2 | 4.1 | 6.4 |
| Air Flow Crushed | 0.90 | 0.84 | 0.78 | 0.68 | 0.73 | 0.69 | 0.98 | 0.86 | 0.77 | 0.59 | 0.80 | 0.93 | 1.23 | 2.50 |
| Pounding Fatigue, % Loss | | | | | | | | | | | | | | |
| Height | 0.7 | 2.9 | 2.3 | 2.9 | 2.5 | 5.7 | 2.0 | 1.7 | 1.7 | 2.1 | — | 0.7 | 1.5 | 2.2 |
| 40% ILD | 36.7 | 37.1 | 24.5 | 27.0 | 27.7 | 34.1 | 36.7 | 35.4 | 38.4 | 22.8 | — | 32.4 | 37.5 | 28.2 |
| Oxygen Index, % O₂ | 31.5 | 29.0 | 32.0 | 31.0 | 31.0 | 31.0 | 32.0 | 32.5 | — | — | 29.0 | 30.5 | 31.0 | 30.0 |
| Cal. 117 Open Flame | | | | | | | | | | | | | | |
| Original | PASS | PASS | PASS | PASS | PASS | PASS | PASS | PASS | PASS | PASS | PASS | PASS | PASS | PASS |
| Heat Aged | PASS | PASS | PASS | PASS | PASS | PASS | PASS | PASS | PASS | PASS | PASS | PASS | PASS | PASS |
| SMOLDERING, % WT. Retained | 99.2 | 99.0 | 98.9 | 98.9 | 98.9 | 99.4 | 99.3 | 99.4 | 99.0 | 99.3 | 99.3 | 99.3 | 99.2 | 99.0 |

TABLE II-continued

| | 9 | 10 | 11 | 12 | 13 | 14 | 15 | 16 | 17 | 18 | 19 | 20 | 21 | 22 |
|---|---|---|---|---|---|---|---|---|---|---|---|---|---|---|
| Radiant Panel, Flame Spread | | | | | | | | | | | | | | |
| SWRI | 80 | 128 | 45 | 162 | 132 | 54 | — | — | — | — | 214 | 47 | 49 | 27 |
| C-133 Test, Bare | — | — | — | — | — | — | — | — | — | — | — | — | PASS | — |
| Covered | PASS | PASS | PASS | PASS | PASS | PASS | FAIL | FAIL | PASS | FAIL | — | FAIL | PASS | PASS |

*DE60F

Examples 23-28

The polyurethane foams of Table III were prepared by charging a one-quart cylindrical container with a suitable quantity of the polyol, water, catalysts, silicone surfactant and flame retardant compounds. The mixture was stirred for about 30 seconds, allowed to set for about 15 seconds and then stirring was resumed. After about 60 seconds elapsed time, the polyisocyanate was added to the container, and the resulting mixture was stirred for about 4 to 5 seconds. The content of the container was then immediately poured into a cardboard cake box, and the foam was allowed to rise therein. After the foam rise was completed, the resulting foam was oven cured for about 15 minutes.

Table III sets forth the ingredients and amounts thereof used to prepare the foams as well as the physical properties of the foams.

The flame retardancy tests, as exemplified by the Radiant Panel Test ASTM E162-81a, indicate that flame retardancy may be obtained with a combination of melamine and other flame retardant compounds.

TABLE III

| Example | 23 | 24 | 25 | 26 | 27 | 28 |
|---|---|---|---|---|---|---|
| Formulation | | | | | | |
| Polyol B | 8.0 | → | → | → | → | → |
| Polyol F | 65.0 | → | → | → | → | → |
| Polyol H | 27.0 | → | → | → | → | → |
| Fyrol CEF | — | 10 | 10 | 5 | — | — |
| Fyrol PCF | — | — | — | — | — | 10 |
| Thermolin 101 | — | — | — | — | 10 | — |
| Melamine | 100. | → | → | → | → | → |
| DEOA | 1.18 | → | → | → | → | → |
| Silicone 5043 | 1.4 | → | → | → | → | → |
| T-12 | 0.1 | → | → | → | → | → |
| Freon 11 | 10. | → | → | → | → | → |
| Water | 2.1 | → | → | → | → | → |
| Dabco 33LV | 0.16 | → | → | → | → | → |
| NIAX A-1 | 0.05 | → | → | → | → | → |
| TDI (105 Index) | 29.21 | → | → | → | → | → |
| Foam Properties | | | | | | |
| Density, PCF | 3.56 | 1.98 | 3.83 | 3.70 | 3.58 | 3.95 |
| Oxygen Index, % $O_2$ | 30.0 | 26.5 | 30.5 | 30.5 | 30.5 | 31.0 |
| Radiant Panel, Flame Speed | 157 | 227 | 35 | 51 | 37 | 43 |

The ASTM E162-81a radiant panel test requires a figure of less than 100 to pass the test. The California 133 test is rated in "pass" or "fail" terms. The California 133 test is done on both covered and uncovered specimines. In the following Examples the covering employed was modacrylic/nylon fabric. In Example 8, 17, 18, and 19, Fyrol CEF was replaced with DE-60F. The results of Tables I, II, and III indicate that a combination of melamine and other flame retardants are required to pass the radiant panel test and the California 133 test.

Examples 29-31

Examples 29-31 were prepared in a manner similar to that employed for Examples 23-28. The Examples of Table IV indicate that amounts of melamine in excess of 55 percent result in foams having deteriorating and unacceptable physical properties.

TABLE IV

| Example | 29 | 30 | 31 |
|---|---|---|---|
| Formulation | | | |
| Polyol B | 8.0 | → | → |
| Polyol A | 87.0 | → | → |
| Fyrol CEF | 5.0 | → | → |
| Melamine | 100. | 175. | 225 |
| DEOA | 1.2 | → | → |
| Silicone 5043 | 1.0 | 1.2 | 1.4 |
| T-12 | 0.1 | → | → |
| Methylene chloride | 5. | → | → |
| Water | 2.4 | → | → |
| Dabco 33LV | 0.18 | → | → |
| NIAX A-1 | 0.06 | → | → |
| TDI (112 Index) | 35.58 | → | → |
| Foam Properties | | | |
| Density, PCF | 3.26 | 4.41 | Foam collapsed |
| Tensile Strength, psi | 9.2 | 8.4 | |
| Elongation, % | 103 | 90 | |
| Tear, pi | 1.1 | 0.9 | |

The embodiments of the invention in which our exclusive privilege or property as claimed are defined as follows:

1. A flame retardant flexible polyurethane foam comprising the reaction product of
    (a) a polyoxyalkylene polyether polyol having an average equivalent weight of from about 200 to about 2500, wherein dispersed without in situ crushing in the polyether polyol is melamine in the amount ranging from about 30 weight percent to about 55 weight percent based on the weight of the foam,
    (b) toluene diisocyanate
    (c) in the presence of a catalyst, a blowing agent, a silicone surfactant,
    (d) optionally a chain extender, and
    (e) an effective amount of another flame retardant other than melamine.

2. The foam of claim 1 wherein flame retardant (b) is employed in the amount of about 1 weight percent to about 15 weight percent of the total composition.

3. The foam of claim 1 wherein the polyether polyol is a blend of a propylene oxide, ethylene oxide adduct of glycerine containing about 17 weight percent ethylene oxide and a propylene oxide adduct of propylene glycol containing about 50 weight percent of a 2:1 styrene acrylonitrile graft dispersion.

4. The foam of claim 3 wherein the glycerine based polyol is about 91.5 weight percent of the polyol blend.

5. The foam of claim 1 wherein the amount of melamine ranges from about 40 to about 45 weight percent of the total composition.

6. The foam of claim 1 wherein flame retardant (b) is selected from the group consisting of Fryol CEF, DE60F, Fyrol PCF and Thermolin 101.

7. A flame retardant flexible polyurethane foam comprising the reaction product of
    (a) a polyoxyalkylene polyether polyol having an average equivalent weight of from about 200 to about 2500, wherein dispersed without in situ crushing in the polyether polyol is melamine in the amount ranging from about 30 weight percent to about 55 weight percent based on the weight of the foam;
    (b) toluene diisocyanate;
    (c) in the presence of a catalyst, a blowing agent, a silicone surfactant;
    (d) optionally a chain extender; and
    (e) an effective amount of another flame retardant other than melamine, wherein said polyol comprises a graft polymer polyol dispersion.

8. The foam of claim 7 wherein said graft polymer polyol dispersion is prepared by the in situ free-radical polymerization of an ethylenically unsaturated monomer or mixture of monomers in a polyol.

9. The foam of claim 7 wherein said polymer dispersion is prepared by the dispersion of a preformed graft polymer into a polyol.

10. The foam of claim 7 wherein said polyol comprises a mixture of at least one conventional polyether polyol and at least one graft polymer polyol dispersion.

11. The foam of claim 1 wherein said foam is a high resiliency foam.

12. The foam of claim 7 wherein said foam is a high resiliency foam.

13. The foam of claim 10 wherein said is a high resiliency foam.

* * * * *